United States Patent Office 3,696,014
Patented Oct. 3, 1972

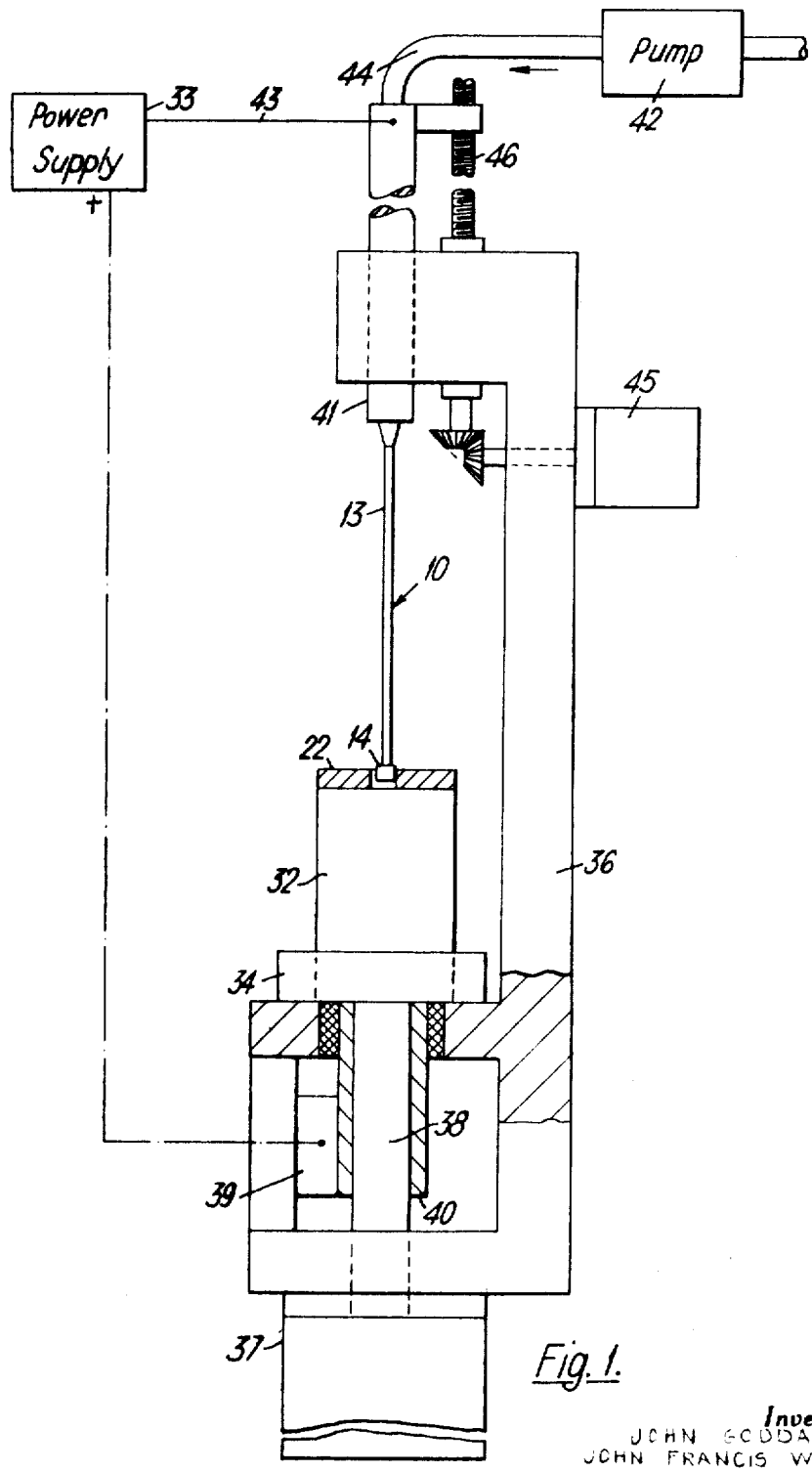

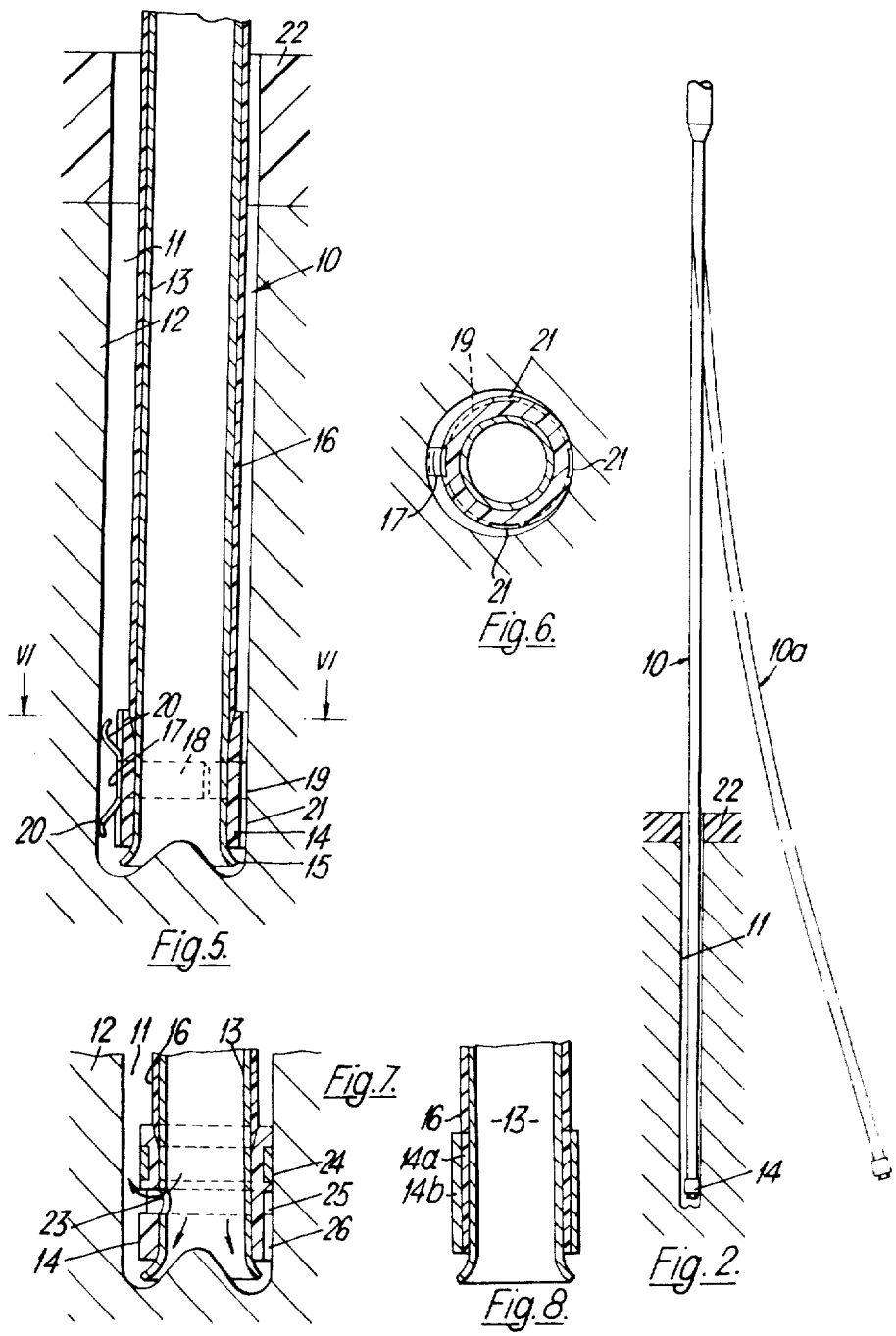

3,696,014
ELECTROLYTIC DRILLING
John Goodard, Bristol, England, John Francis Wilson, West Peabody, Mass., and Derek Aubrey Glew, Bristol, England, assignors to Rolls-Royce Limited, Moor Lane, Derby, England
Filed Apr. 27, 1970, Ser. No. 32,112
Int. Cl. B23p 1/00, 1/02, 1/12
U.S. Cl. 204—143 M                    10 Claims

ABSTRACT OF THE DISCLOSURE

Electrolytic drilling wherein the electrode is continuously rotated relatively to the workpiece, and lateral pressing contact is continuously maintained between a predetermined side only of an insulated part of the electrode, adjacent to the operating part, and the side wall of the hole.

---

The invention relates to methods and equipment for drilling holes in electrically conducting material by electrolytic action.

In a known electrolytic drilling method a tubular electrode of electrically conducting material provided with an external coating of insulating material except over a tip portion is advanced into a workpiece while an electrolyte is caused to flow through the electrode and through the hole being drilled, and an electrical voltage is applied between the electrode and the workpiece to establish electro-erosion of the workpiece. The voltage may, for example, be sufficient to cause a current density in the electrolyte in the region of the tip of the electrode of over 100 amperes per square inch of the active area of the electrode.

This invention relates to drilling long, small diameter holes, by which is meant for example a hole having a diameter in the range 0.060 to 0.190 inch, and a length in the range 3 to 12 inches.

The invention provides a method and apparatus for the drilling of holes which are intrinsically straight. This is achieved without the need for a rigid electrode, and without the need for exact control of the various parameters of the drilling process, such as the electric current, flow of electrolyte, composition of electrolyte, and temperature.

The essential features of a method according to the present invention are continuously rotating the electrode about its axis relatively to the workpiece, and continuously maintaining lateral pressing contact between a predetermined one side only of the insulated part, adjacent to the operating part, and the side wall of the hole.

Figure 4:
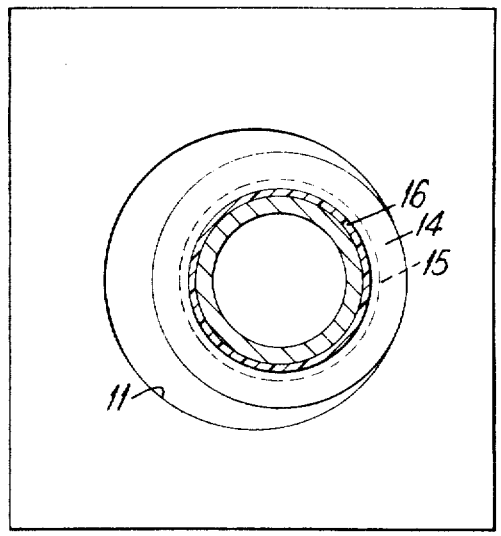
Figure 3:
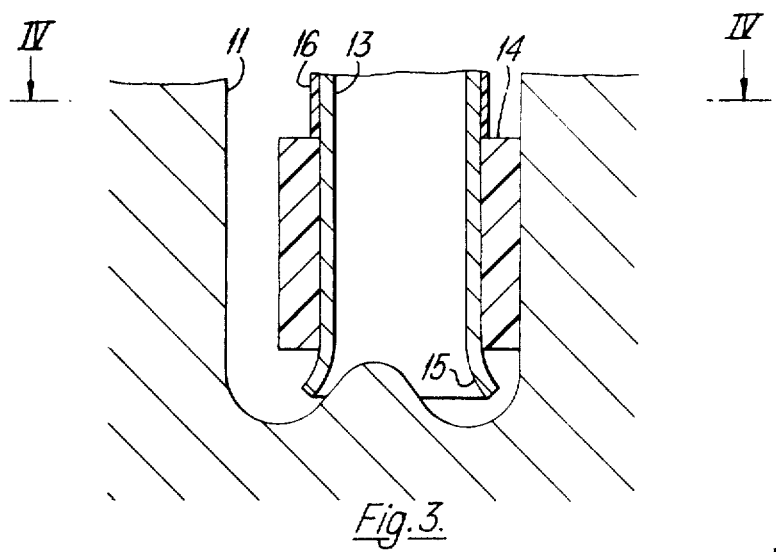

Examples of methods and apparatus embodying this invention are shown in the accompanying drawings. For brevity of description, the electrode in these examples is called "the tool." In these drawings:

FIG. 1 is a diagrammatic elevation of one apparatus;
FIG. 2 is an elevation of the tool, in the hole;
FIG. 3 is an enlarged fragmentary vertical section of the tool, in a hole, showing the part of the tool adjacent to its tip;
FIG. 4 is a cross section on the line IV—IV in FIG. 3;
FIG. 5 is a longitudinal section of part of a second tool, in a hole;
FIG. 6 is a cross section on the line VI—VI in FIG. 5;
FIG. 7 is a fragmentary longitudinal section of a third tool, in a hole; and
FIG. 8 is a fragmentary longitudinal section of a fourth tool.

In the apparatus shown in FIG. 1, the elongated tool is shown at 10. For clarity in this small-scale figure, the tool is shown thicker in relation to its length than in FIG. 2.

A workpiece 32, here shown simply as a block of metal, is mounted in a chuck 34. The chuck is supported for rotation in fixed structure 36. Rotation is imparted by a motor 37 through a shaft 38. The positive pole of an electric power supply 33 is connected to a brush 39 which cooperates with a conducting sleeve 40 which surrounds the shaft 38 and conveys a large current to the workpiece.

The tool 10 is supported for longitudinal movement by a slide 41 in the fixed structure 36. Means for advancing the tool is indicated as a motor 45 driving a lead screw 46. Such means is well known from existing electrolytic drilling apparatus. The slide is connected by a flexible conductor 43 to the negative pole of the power supply 33. Electrolyte is supplied by a pump 42 from a source, not shown, through a flexible hose 44 to the slide, and thence to the interior of the tube, which is tubular as described below.

The tool comprises a long slender metal tube 13 on which is fixed near its tip end a sleeve 14 made of a plastic such as nylon, P.V.C., or P.T.F.E. which is fairly hard and provides a good bearing surface at the operating temperature, which is about 40° C. The sleeve may be attached to the tube by means of an epoxy resin or other suitable adhesive, and is set back from the extreme tip of the tube, the projecting part of the latter being of bell-mouthed form as shown at 15 to minimise turbulence in the flow of electrolyte, and acting as the cathode.

The outer surface of the part of the tube 13 above the sleeve 14 is provided with a layer 16 of insulating material. This may be for example a P.V.C. varnish or a layer of adhesive plastic tape, but is preferably a layer of ceramic applied by flame spraying or plasma arc spraying and subsequently sealed with a coating of epoxy or other suitable resin.

The dimensions in one particular case are:

|  | Inch |
|---|---|
| Thickness of tube wall 13 | 0.010 |
| Thickness of sleeve wall 14 | 0.015 |
| Thickness of insulation 16 | 0.005 |
| Outer diameter of tube wall | 0.079 |
| Outer diameter of sleeve wall | 0.110 |
| Diameter of hole 11 | 0.120 |

Drilling is started by engaging the tip of the tool in a hole in a guide block 22 made of insulating material, which is attached to the top of the workpiece. The tool is advanced and rotated relatively to the workpiece, supplies of electrolyte and electric current being simultaneously maintained.

In order to maintain lateral pressing contact between one side of the sleeve 14 and the side wall of the hole, the tool is prepared so that it is curved towards that side when free of external force. This curved shape is shown at 10a in FIG. 2. This may be achieved by bending a straight tube beyond its elastic limit to such a shape that when the tip of the tool is pulled into line with the hole in the guide block 22, and is inserted into the hole and released, the tool assumes a substantially straight shape as shown at 10 in FIG. 2. In this condition stresses within the tool urge the predetermined side of the sleeve 14 against the side of the hole. The condition persists as the tool is advanced into the workpiece to form the hole 11.

The metal tube 13 is preferably a drawn stainless steel tube, for example an alloy having the following composition:

|   | Percent |
|---|---|
| Nickel | 11.00 |
| Chromium | 20.00 |
| Manganese | 2.00 |
| Carbon | 0.08 |
| Sulphur | 0.045 |
| Phosphorus | 0.045 |
| Iron | Remainder |

The tube may be bent by manual manipulation to the required shape 10a. The amount of bend is such that, for a tube having the dimensions given above and 12 inches long, the tip is displaced 2.5 inches laterally from the initial straight condition. When the tube is straightened, a sideways force of about 330 grams is established between the side of the sleeve and the side of the hole.

The electrolyte is conveniently supplied through the tube 13 at a pressure of 25 to 75 pounds per square inch, and returns through the drilled hole 11, but so far as the method of operation is concerned, the flow direction could equally well be reversed. A suitable electrolyte consists of sodium chloride 2% and sodium nitrate 18%, by weight, in water.

In operation, each rotation of the workpiece is accompanied by the same unit amount of advance of the tool. If the other parameters remain constant, in particular the electric current, the flow of electrolyte, the composition of electrolyte, and the temperature, each unit of advance involves removal of he same amount of metal from adjacent to the bottom of the hole 11.

The shape of the increment of hole made during each rotation is determined by the shape of the uninsulated part of the tool, and by the positions which is assumes during the rotation. The motion of the tip of the tool relatively to the workpiece, considered in plan, is that of a disc which, during each rotation, turns once around its own centre, while that centre follows one circuit of a path. The shape and size of this path is itself determined by the cross-sectional shape of the preceding part of the hole engaged by the sleeve 14. If this preceding part is circular, the path will be circular and the increment will also be circular and will be centred on the axis of relative rotation between tool and workpiece. Moreover, any departure of the hole from circularity is reproduced to a lesser extent in the increment. That is to say, any irregularities, e.g. on oval section, tend to disappear, as the hole progresses. Hence the process produces a hole which is intrinsically of circular cross section and is intrinsically straight.

The diameter of the hole depends on the rate of advance and on the amount of metal removed per rotation, which depends on the various parameters mentioned above. If these vary somewhat as the hole progresses, the diameter will vary, but the axis of the hole will remain straight. Likewise, if the parameters have values which produce a hole 11 of a different size from the hole in the guide block 22, the holes will nevertheless have a common straight axis.

The tool itself is made circular as a matter of convenience, but the circularity of the hole depends on the rotation, not on the shape of the tool. In particular, the hole will remain circular if the uninsulated part of the tool is dented or chipped, or if the edge of the insulation is chipped so that the amount of tool exposed is not uniform all round.

The rate of rotation should be sufficiently great in relation to the rate of advance to ensure that he wall of the hole does not have any appreciable screw-threaded formation. For example there may be one rotation for every 0.010 inch advance, where the thickness of the material at the bellmouth of the tool is likewise 0.010 inch.

An example of the straightness attainable by the use of the invention is that in a hole 12 inches long and 0.120 inch diameter the straightness is better than 0.002 inch per inch length. This is accompanied by a surface finish of the wall of the hole better than 125 micro-inches CLA (Centre Line Average).

It is convenient for the sleeve 14 to be of uniform thickness, but the operative surface is on the predetermined side only, so the remainder may be made thinner. In order to prevent short circuiting between the tip and the wall of the hole, the sleeve 14 must, on he predetermined side, extend laterally beyond the bellmouth 15.

Preferably, as shown, the sleeve 14 is set back from the extreme tip, leaving a small part of the tool outer surface exposed. This exposed part contributes to a side machining effect, and assists in obtaining satisfactory axial and radial clearances between the tool and the wall of the hole as the tool advances.

In the second example shown in FIGS. 5 and 6, one side of the sleeve 14 at the tip end of the tool is biased against the side wall of the hole by means of a spring device 17, comprising a pair of arms 18 seated in a peripheral groove 19 in the sleeve, and a pair of resilient projections in the form of arm 20 engaging the opposite side of the hole. The spring may be of a metal with a passive surface immune to electrolytic action. The sleeve is preferably also provided with a number of longitudinal grooves 21 to assist in carrying away electrolyte.

In the third example illustrated by FIG. 7, pressure of electrolyte is used to produce a lateral force between the sleeve 14 and the wall of the hole 11. For this purpose an opening 23 is formed through the tube 13 and sleeve 14 at one side of the tip portion of the tool. Some of the electrolyte supplied through the tube a high pressure escapes sideways through the opening 23, and there is consequently a thrust in the opposite direction pressing the sleeve against the wall of the hole.

FIG. 7 also illustrates a variation in the arrangement of the sleeve 14, which is here provided with an upper peripheral groove containing a ring 24 of metal or of a carbide, for example tungsten carbide, and a lower peripheral groove 25 with which longitudinal grooves 26 communicate for the purpose of carrying away electrolyte from that side of the hole on which the sleeve bears.

FIG. 8 shows a modification designed to reduce wear caused by relative rotation of the tool and workpiece. In this example there is an inner sleeve 14a fixed to the tube 13, and an outer sleeve 14b which can rotate relatively to the inner sleeve, being restrained axially by flanges or the like not shown. This outer sleeve can thus roll round the wall of the hole.

Both sleeves may be of low-friction material, e.g. P.T.F.E. Alternatively the inner sleeve may be of P.T.F.E. and the outer sleeve of sintered tungsten carbide.

The use of the invention also has the advantage of counteracting vibration. To obtain a high rate of penetration, which is economically desirable, the flow of electrolyte past the tip of the tool has to be high, and the difficulty has been encountered, in the known method, that turbulence of the flow around the tip of the tool causes vibration of the tool. Up to a certain rate of penetration a good insulating coating having a thickness of 0.004 inches or over will prevent the vibrating tool tip short-circuiting against the sides of the hole, but nevertheless it is found that the diameter of the hole varies, giving a characteristic ripple to the wall of the hole. This is believed to be due to variations in the amplitude of the vibration. Moreover, as the penetration rate is increased, the diameter of the hole decreases and higher electrolyte supply pressures have to be used to maintain an adequate flow through the reduced clearance, which further aggravates the vibration. Eventually the vibrating tool may short-circuit at its tip, where the high velocity of the electrolyte and the electrical activity causes chipping or peeling of the insulation.

The lateral pressing contact, which is a feature of the present invention, serves the additional function of suppressing vibration.

The effectiveness of the lateral contact between the tool and the wall of the hole in suppressing vibration of the tool is dependent upon the magnitude of this force, and it will be appreciated that the magnitude which can economically be used is related to the wearing properties of the contact surface on the tool. A sleeve of plastic having good bearing properties, for example nylon, P.V.C. or P.T.F.E., will also have good wearing properties.

We claim:

1. A method of electrolytic drilling of an intrinsically straight hole in a workpiece,
   using an electrode having an elongated insulated body part and an uninsulated operating part, comprising the simultaneous steps of:
   advancing the electrode relatively into the workpiece,
   rotating the electrode about its axis relatively to the workpiece,
   maintaining flow of electrolyte between the operating part and the workpiece,
   supplying an electrical voltage between the operating part and the workpiece to establish electro-erosion of the workpiece, and
   maintaining lateral pressing contact between a predetermined one side only of the insulated part, adjacent to the operating part, and the side wall of the hole.

2. A method according to claim 1, in which the lateral pressing contact is maintained by resilient means extending laterally from the insultaed part opposite said predetermined one side, into engagement with the side wall of the hole.

3. A method according to claim 1, including the preliminary step of preparing the electrode so that it is curved towards said predetermined one side when free of external stress.

4. A method according to claim 1, in which the lateral pressing contact is maintained by discharging electrolyte laterally from the electrode through an opening opposite said predetermined one side.

5. Apparatus for electrolytically drilling an intrinsically straight, long, small-diameter hole in a workpiece, comprising, in combination:
   an electrode having an elongated insulated laterally flexible body part and an uninsulated operating part,
   means for mounting a workpiece,
   means for advancing the electrode relatively into the workpiece,
   means for rotating the electrode about its axis relatively to the workpiece,
   means for maintaining a flow of electrolyte between the operating part and the workpiece,
   means for supplying an electrical voltage between the operating part and the workpiece to establish electro-erosion of the workpiece, and
   means for maintaining lateral pressing contact, during rotation of the electrode, between the side wall of the hole and a predetermined one side only of the electrode through the insulated part adjacent to the operating part.

6. Apparatus according to claim 5, in which the means for maintaining lateral pressing contact includes resilient means extending laterally from the insulated part opposite said predetermined one side, into engagement with the side wall of the hole.

7. Apparatus according to claim 5, in which the electrode itself constitutes the means for maintaining lateral pressing contact, and when free of external stress, is curved towards said predetermined one side.

8. Apparatus according to claim 5, in which the means for maintaining lateral pressing contact includes an opening in the electrode opposite said predetermined one side.

9. Apparatus according to claim 5, in which the electrode comprises a tube of electrically conducting material having a tip with an opening in the end and provided with a coating of insulating material leaving said tip uninsulated, and a sleeve of a plastic surrounding the tube near its extreme tip, said sleeve extending laterally beyond the tube on at least said predetermined side.

10. Apparatus according to claim 9, in which the electrode also comprises a second sleeve surrounding the first sleeve, and means mounting the second sleeve to rotate relatively to the first sleeve.

References Cited
UNITED STATES PATENTS

| | | | |
|---|---|---|---|
| 2,715,172 | 8/1955 | Larkins, Jr. | 219—69 E |
| 3,311,549 | 3/1967 | Bruns | 204—224 |
| 3,427,239 | 2/1969 | Abt et al. | 204—143 M |
| Re. 26,970 | 10/1970 | Bentley et al. | 204—143 M |
| 3,058,895 | 10/1962 | Williams | 204—225 X |
| 3,271,288 | 9/1966 | Crawford et al. | 204—290 R |
| 3,243,365 | 3/1966 | Alkin | 204—290 R |
| 3,306,838 | 2/1967 | Johnson | 204—143 M |

JOHN H. MACK, Primary Examiner

D. R. VALENTINE, Assistant Examiner

U.S. Cl. X.R.

204—212, 224, 225, 284, 290 R; 219—69 E

UNITED STATES PATENT OFFICE
CERTIFICATE OF CORRECTION

Patent No. 3,696,014            Dated October 3, 1972

Inventor(s) John Goddard; John Francis Wilson and Derek Aubrey Glew

It is certified that error appears in the above-identified patent and that said Letters Patent are hereby corrected as shown below:

In the heading of each of the three sheets of drawing and in the title at the top of page 1, Goodard should read Goddard.

Signed and sealed this 8th day of May 1973.

(SEAL)
Attest:

EDWARD M. FLETCHER, JR.
Attesting Officer

ROBERT GOTTSCHALK
Commissioner of Patents